(12) United States Patent
Choi et al.

(10) Patent No.: US 7,935,654 B2
(45) Date of Patent: May 3, 2011

(54) OXIDE CATALYST AND PHOSPHORIC OXIDE CATALYST FOR HYDROCARBON STEAM CRACKING, METHOD FOR PREPARING THE SAME AND METHOD FOR PREPARING OLEFIN BY USING THE SAME

(75) Inventors: Jun-seon Choi, Daejeon (KR); Jun-Han Kang, Daejeon (KR); Jong-hun Song, Daejeon (KR); Byoung-gi Park, Yeosu-si (KR); Chang-hoon Kang, Yeosu-si (KR); Si-hyun Noh, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 677 days.

(21) Appl. No.: 11/902,665

(22) Filed: Sep. 24, 2007

(65) Prior Publication Data

US 2008/0081008 A1   Apr. 3, 2008

(30) Foreign Application Priority Data

Sep. 28, 2006 (KR) .................. 10-2006-0094620
Sep. 28, 2006 (KR) .................. 10-2006-0094621

(51) Int. Cl.
*B01J 23/00* (2006.01)
(52) U.S. Cl. ........ 502/308; 502/302; 502/309; 502/325; 502/349; 502/350; 502/353
(58) Field of Classification Search .......... 502/302–305, 502/308, 309, 311, 313, 315, 349, 350, 353, 502/324, 325
See application file for complete search history.

(56) References Cited

U.S. PATENT DOCUMENTS

| | | | | |
|---|---|---|---|---|
| 7,232,780 | B2 * | 6/2007 | Zhu et al. ............. | 501/127 |
| 2003/0180473 | A1 * | 9/2003 | Nishihara et al. ...... | 427/457 |
| 2005/0245387 | A1 * | 11/2005 | Zhu et al. ............ | 501/127 |

OTHER PUBLICATIONS

Takita et al. "Catalytic decomposition of CFCs", Catalysis Surveys from Japan 2 (1998) 165-173.*
Sohn et al. "Surface Characterization of Chromium Oxide-Zirconia Catalyst" Langmuir 1993 9, 126-131.*

* cited by examiner

*Primary Examiner* — Stanley Silverman
*Assistant Examiner* — Anthony J Zimmer
(74) *Attorney, Agent, or Firm* — McKenna Long & Aldridge LLP

(57) ABSTRACT

The present invention relates to an oxide catalyst and a phosphoric oxide catalyst for hydrocarbon steam cracking, method for preparing the same and a method for preparing olefin by using the same. More precisely, the present invention relates to an oxide catalyst for hydrocarbon steam cracking represented by formula 1 and a phosphoric oxide catalyst for hydrocarbon steam cracking represented by formula 3 which would be used for the production of olefin such as ethylene and propylene by hydrocarbon steam cracking, and a method for preparing the same. The present invention provides an oxide catalyst and a phosphoric oxide catalyst for hydrocarbon steam cracking that has excellent thermo-stability at high temperature and improved olefin yield.

$CrZr_jA_kO_x$   [Formula 1]

$CrZr_jA_kP_lO_x$   [Formula 3]

Wherein, j, k, l and x are as indicated in the description.

4 Claims, No Drawings

OXIDE CATALYST AND PHOSPHORIC OXIDE CATALYST FOR HYDROCARBON STEAM CRACKING, METHOD FOR PREPARING THE SAME AND METHOD FOR PREPARING OLEFIN BY USING THE SAME

This application claims the benefit of the filing date of Korean Patent Application Nos. 10-2006-0094620 & 10-2006-0094621 filed on Sep. 28, 2006 & Sep. 28, 2006 in the Korean Intellectual Property Office, the disclosure of which is incorporated herein in its entirety by reference.

TECHNICAL FIELD

The present invention relates to an oxide catalyst and a phosphoric oxide catalyst for hydrocarbon steam cracking and a method for preparing the same, more precisely an oxide catalyst and a phosphoric oxide catalyst for hydrocarbon steam cracking which have excellent thermo-stability particularly at high temperature and enable the production of olefin with improved yield and a method for preparing the same.

BACKGROUND ART

Ethylene and propylene are very important basic raw materials in petrochemical industry, which are produced by cracking hydrocarbon comprising of paraffin compounds such as natural gas, naphtha, gas oil, etc, at a high temperature at least 800° C. in the presence of steam. To increase the yield of ethylene and propylene from hydrocarbon steam cracking, conversion rate of hydrocarbon or olefin selectivity has to be increased. However, the pure hydrocarbon steam cracking itself has limit in increasing hydrocarbon conversion rate or olefin selectivity. So, various methods have been proposed to increase the yield of olefin.

One of those methods proposed to increase the yield of ethylene and propylene so far is steam cracking using a catalyst. U.S. Pat. No. 3,644,557 describes a method using a catalyst comprising magnesium oxide and zirconium oxide, U.S. Pat. No. 3,969,542 describes a method using a catalyst containing calcium aluminate as a basic component, U.S. Pat. No. 4,111,793 describes a method using manganese oxide catalyst supported by a zirconium oxide, European Patent Publication No. 0212320 describes a method using an iron catalyst supported by a magnesium oxide, and U.S. Pat. No. 5,600,051 describes a method using a catalyst comprising of barium oxide, alumina and silica. In addition, PCT No. 2004/105935 describes a method using a catalyst comprising of potassium magnesium phosphate, silica and alumina. These catalysts were known to increase the yield of olefin by acting as a heating medium during hydrocarbon steam cracking, but the increase of olefin yield was not significant, compared with when an inactive carrier was used.

Russian Patent No. 1,011,236 describes a potassium vanadate catalyst modified by boron oxide and alumina carrier. However, using such an alkatimetal oxide or potassium vanadate as a catalyst did not increase olefin yield much and even dragged down the yield unavoidably at high temperature for the hydrocarbon decomposition. More precisely, the above catalysts might exist in the liquid phase inside of the high temperature cracking reactor owing to the low melting points of the catalyst components, and these catalyst components are volatilized by fast circulation of reaction gas, so that the catalyst activity is decreased with respect to the reaction time.

U.S. Pat. No. 7,026,263 describes a method using a hybrid catalyst comprising of molybdenum oxide, alumina, silica, silicalite and zirconium oxide. With this catalyst, reaction carried on at low temperature with low hydrocarbon flow. But, the reaction temperature needs to be raised to at least 800° C. as hydrocarbon flow increases. The above catalyst, however, has very low thermal stability at high temperature so that it is melted or lost its catalytic activity.

Therefore considering economic aspects of hydrocarbon steam cracking or to avoid the complexity of processes, a novel catalyst that is able to enhance olefin yield significantly compared with an inactive carrier catalyst and has enhanced thermal stability at high temperature is required.

DISCLOSURE OF THE INVENTION

It is an object of the present invention to overcome the above problems of the conventional methods and to provide a catalyst which has excellent thermal stability at high temperature and increases light olefin yield significantly, which is an oxide catalyst for hydrocarbon steam cracking represented by the following formula 1 or a phosphoric oxide catalyst for hydrocarbon steam cracking represented by the following formula 3, and a preparing method of the same.

$$CrZr_jA_kO_x \quad \text{[Formula 1]}$$

$$CrZr_jA_kP_lO_x \quad \text{[Formula 3]}$$

Wherein, j, k, l and x are as indicated in the description.

It is another object of the present invention to provide a preparing method of olefin using the oxide catalyst and phosphoric oxide catalyst for hydrocarbon steam cracking of the invention.

The above objects of the present invention can be achieved by the following embodiments of the present invention.

To achieve the above objects, the present invention provides an oxide catalyst for hydrocarbon steam cracking represented by the following formula 1.

$$CrZr_jA_kO_x \quad \text{[Formula 1]}$$

Wherein, $0.5 \leq j \leq 120$, $0 \leq k \leq 50$, A is a transition metal, and x is a number corresponding to the atomic values of Cr, Zr and A, and the numbers of j and k.

The present invention also provides a phosphoric oxide catalyst for hydrocarbon steam cracking represented by the following formula 3.

$$CrZr_jA_kP_lO_x \quad \text{[Formula 3]}$$

Wherein, $0.1 \leq j \leq 50$, $0 \leq k \leq 30$, A is a transition metal, $0.5 \leq l \leq 100$, and x is a number corresponding to the atomic values of Cr, Zr, A and P and the numbers of j, k and l.

The present invention provides a preparing method of an oxide catalyst for hydrocarbon steam cracking, comprising the following steps:

(a) preparing an aqueous solution by mixing a Cr containing compound and a Zr containing compound or a Cr—Zr containing compound with water;

(b) preparing a slurry by coprecipitation after adding ammonia water to the aqueous solution;

(c) reflux-heating or hydrothermal treating the prepared slurry; and (d) preparing an oxide catalyst for hydrocarbon steam cracking by filtering, drying and calcination the slurry of step (c).

The present invention provides a preparing method of a phosphoric oxide catalyst for hydrocarbon steam cracking, comprising the following steps:

(a) preparing an aqueous solution by mixing a Cr containing compound and a Zr containing compound or a Cr—Zr containing compound with water;

(b) adding a phosphorus containing compound to the aqueous solution;

(c) preparing a slurry by coprecipitation after adding ammonia water to the aqueous solution of (b);

(d) reflux-heating or hydrothermal treating the prepared slurry; and (e) preparing a phosphoric catalyst for hydrocarbon steam cracking by filtering, drying and calcination the slurry of step (d).

The present invention further provides a preparing method of olefin containing the step of hydrocarbon steam cracking in the presence of the oxide catalyst represented by the following formula 1 or the phosphoric oxide catalyst represented by the following formula 3 for hydrocarbon steam cracking.

$$CrZr_jA_kO_x \qquad \text{[Formula 1]}$$

Wherein, $0.5 \leq j \leq 120$, $0 \leq k \leq 50$, A is a transition metal, and x is a number corresponding to the atomic values of Cr, Zr and A and the numbers of j and k.

$$CrZr_jA_kP_lO_x \qquad \text{[Formula 3]}$$

Wherein, $0.1 \leq j \leq 50$, $0 \leq k \leq 30$, A is a transition metal, $0.5 \leq l \leq 100$, and x is a number corresponding to the atomic values of Cr, Zr, A and P and the numbers of j, k and l.

The present invention is described in detail hereinafter.

The conventional method for hydrocarbon steam cracking is steam cracking at a high temperature at least 800° C. with reactant such as natural gas, naphtha, or gas oil in the absence of a catalyst to produce ethylene and propylene.

In such hydrocarbon steam cracking process, coke is accumulated in the side-wall of a reactor or on the surface of a catalyst, which has to be eliminated regularly. The coke is burned in the presence of air and steam, even if the heat of combustion is cooled down by steam, rising local temperature is inevitable. At this time, the local temperature rises to approximately 1000° C. which might bring the loss of the catalytic activity.

The present inventors confirmed that using an oxide catalyst and a phosphoric oxide catalyst containing Cr and Zr or an oxide catalyst and a phosphoric oxide catalyst containing Cr, Zr and one or more metal components selected from the group consisting of Ti, Nb, Mo, V, Co, Ni, W, Fe and rare earth metals results in the increase of olefin yield based on the excellent catalytic activity, compared with the conventional method, and thus the inventors completed this invention by further confirming that the method of the invention using such catalysts mentioned above can overcome the disadvantages of the conventional method such as low olefin yield and unstable hydrocarbon decomposition at nigh temperature.

The oxide catalyst for hydrocarbon steam cracking of the invention is characterized by containing Cr and Zr and being represented by the following formula 1.

$$CrZr_jA_kO_x \qquad \text{[Formula 1]}$$

Wherein, $0.5 \leq j \leq 120$, preferably $5 \leq j \leq 90$ and more preferably $70 \leq j \leq 90$, and $0 \leq k \leq 50$, preferably $5 \leq k \leq 30$, and more preferably $15 \leq k \leq 28$, A is a transition metal, and x is a number corresponding to the atomic values of Cr, Zr, and A and the numbers of j and k.

In formula 1, A contains one or more metal components selected from the group consisting of Ti, Nb, Mo, V, Co, Ni, W, Fe and rare-earth metals.

The oxide catalyst for hydrocarbon steam cracking of the invention is characterized by containing a catalyst represented by the following formula 2 in which k of formula 1 is 0.

$$CrZr_jO_x \qquad \text{[Formula 2]}$$

Wherein, $0.5 \leq j \leq 120$, preferably $5 \leq j \leq 90$ and more preferably $70 \leq j \leq 90$, and x is a number corresponding to the atomic values of Cr and Zr and the number of j.

The phosphoric catalyst for hydrocarbon steam cracking of the invention is characterized by containing Cr and Zr and being represented by the following formula 3.

$$CrZr_jA_kP_lO_x \qquad \text{[Formula 3]}$$

Wherein, $0.1 \leq j \leq 50$, preferably $0.5 \leq j \leq 15$, and $0 \leq k \leq 30$, preferably $0 \leq k \leq 10$, and A is a transition metal, and $0.5 \leq l \leq 100$, preferably $1 \leq l \leq 4$, and x is a number corresponding to the atomic values of Cr, Zr, A and P and the numbers of j, k and l.

The phosphoric oxide catalyst for hydrocarbon steam cracking of the invention is characterized by containing a catalyst represented by the following formula 4 in which k of formula 3 is 0.

$$CrZr_jP_lO_x \qquad \text{[Formula 4]}$$

Wherein, $0.1 \leq j \leq 50$, preferably $0.5 \leq j \leq 15$, and $0.5 \leq l \leq 100$, preferably $1 \leq l \leq 4$, and x is a number corresponding to the atomic values of Cr, Zr and P and the numbers of j and l.

When the oxide catalyst or the phosphoric oxide catalyst of the invention is used as a catalyst for hydrocarbon steam cracking, the reaction yield is increased and also light olefin, particularly propylene, selectivity and thermal stability are improved.

In particular, when the hydrocarbon steam cracking is performed at 750° C., the ratio of ethylene to propylene is preferably 1:1-1:4.

The preparing method of an oxide catalyst for hydrocarbon steam cracking is characteristically comprised of the steps of (a) preparing an aqueous solution by mixing a Cr containing compound and a Zr containing compound or a Cr—Zr containing compound with water; (b) preparing a slurry by coprecipitation after adding ammonia water to the aqueous solution; (c) reflux-heating or hydrothermal treating the prepared slurry; and (d) preparing an oxide catalyst for hydrocarbon steam cracking by filtering, drying and calcination the slurry of step (c).

In step (a), an aqueous solution is prepared by mixing a metal compound with water.

The Cr containing compound and the Zr containing compound or the Cr—Zr containing compound above can be salts such as sulfates, nitrates, oxalates, halides or chlorides and particularly nitrates are more preferred.

The Cr containing compound and the Zr containing compound or the Cr—Zr containing compound can be mixed with the third metal compound. At this time, the third metal compound is one or more metal components selected form the group consisting of Ti, Nb, Mo, V, Co, Ni, W, Fe and rare earth metals, and Ti, Ni and rare earth metals are preferred and Ti and Y are more preferred.

The Cr containing compound and the Zr containing compound or the Cr—Zr containing compound can additionally include the third metal compound which is one or more metals selected from the group consisting of Ti, Nb, Mo, V, Co, Ni, W, Fe and rare earth metals, and Ti, Ni, and rare earth metals are preferred and Ti and Y are more preferred.

The each third metal compound herein can be salt, acid, oxide, hydroxide or alkoxide. If a metal component of the third metal compound is alkoxide precursor, alkoxide will be hydrolyzed in water and then it might be extracted as a solid salt, in that case a strong acid such as nitric acid can be added to dissolve the solid salt.

The metal component of the third metal compound can be dissolved in water and then mixed with Cr and Zr aqueous solutions, or can be dissolved in water together with Cr and Zr precursors.

The aqueous solution which above compounds are dissolved can be heated and stirred for at least one hour at 40-80° C., preferably at 60-70° C., to be a complete mixture.

In step (b), a slurry is prepared by adding ammonia water to the aqueous solution of (a) with regulating pH to 7-9, preferably 8-8.5, for coprecipitation.

In step (c), the slurry of (b) is reflux-heated at the same temperature of step (a) for at least 12 hours or hydrothermal-treated by autoclave at 60-150° C.

In step (d), a catalyst is prepared by filtering, drying and calcination the slurry of step (C).

It is preferred to dry the slurry at 120° C. for at least 2 hours.

It is preferred to calcine the slurry at 750-1600° C. for at least 4 hours. When the slurry is calcined in the above temperature, sintering is not rapidly induced, protecting catalytic activity from being damaged.

The preparing method of a phosphoric oxide catalyst for hydrocarbon steam cracking is characteristically comprised of the steps of (a) preparing an aqueous solution by mixing a Cr containing compound and a Zr containing compound or a Cr—Zr containing compound with water, (b) adding a phosphorus containing compound to the aqueous solution; (c) preparing a slurry by coprecipitation after adding ammonia water to the aqueous solution of step (b); (d) reflux-heating or hydrothermal-treating the prepared slurry; and (e) preparing a phosphoric catalyst for hydrocarbon steam cracking by filtering, drying and calcination the slurry of step (d).

In step (a), an aqueous solution is prepared by mixing a metal compound with water.

The Cr containing compound and the Zr containing compound or the Cr—Zr containing compound above can be salts such as sulfates, nitrates, oxalates, halides or chlorides and particularly nitrates are more preferred.

The Cr containing compound and the Zr containing compound or the Cr—Zr containing compound can be mixed with the third metal compound. At this time, the third metal compound is one or more metal components selected form the group consisting of Ti, Nb, Mo, V, Co, Ni, W, Fe and rare earth metals, and La, Ce, Ti and Ni are preferred.

The each third metal compound herein can be salt, acid, oxide, hydroxide or alkoxide. If a metal component of the third metal compound is alkoxide precursor, alkoxide will be hydrolyzed in water and then it might be extracted as a solid salt, in that case a strong acid such as nitric acid can be added to dissolve the solid salt.

The metal component of the third metal compound can be dissolved in water and then mixed with Cr and Zr aqueous solutions, or can be dissolved in water together with Cr and Zr precursors.

The metal component of the third metal compound can be added to the aqueous solution together with Cr and Zr in step (a) to prepare a catalyst, or impregnated after calcining of a phosphoric oxide catalyst containing Cr and Zr or solid-reacted as a precursor for the combination with the catalyst.

In step (b), the aqueous solution of step (a) is heated and stirred and when temperature is raised to 40-80° C., preferably to 60-70° C., a phosphorus containing compound is added, followed by further stirring for at least one hour for completing the mixing.

The phosphorus containing compound can be phosphoric acid, ammonium phosphate, or their salts, and phosphoric acid is preferred.

In step (c), a slurry is prepared by adding ammonia water to the aqueous solution added with phosphorus in step (b) with regulating pH to 3-6, preferably 4-4.5, for coprecipitation.

In step (d), the slurry of step (c) is reflux-heated at the same temperature set at step (b) for at least 12 hours or hydrothermal-treated by autoclave at 60-150° C.

In step (e), a catalyst is prepared by filtering, drying and calcination the slurry of step (d).

It is preferred to dry the slurry at 120° C. for at least 6 hours.

It is preferred to fire the slurry at 750-1800° C. for at least 4 hours. When the slurry is fired in the above temperature, sintering is not rapidly induced, protecting catalytic activity from being damaged.

The preparing method of light olefin of the present invention characteristically contains the step of hydrocarbon steam cracking using the oxide catalyst represented by formula 1 or the phosphoric oxide catalyst represented by formula 3.

The light olefin of the invention indicates the olefin that has carbon number of less than 4, which is particularly ethylene or propylene.

Hydrocarbon steam cracking to produce light olefin is performed at 600-1000° C., at the weight ratio of steam to hydrocarbon of 0.3-1.0, and the LHSV is 1-20 $hr^{-1}$.

An appropriate reactor for the hydrocarbon steam cracking herein can be fixed bed reactor, fluidized bed reactor and moving bed reactor. In case of using the fixed bed reactor, a catalyst molded in round or pellet type can be used, but at this time high differential pressure is generated in the catalyst layer. To solve this problem, a catalyst needs to be molded in raschig ring or other specific form to increase porosity of the catalyst layer.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

Example 1

To 60° C. distilled water were added 2.96 g of $Cr(NO_3)_3 \cdot 9H_2O$ and 8.93 g of $ZrO(NO_3)_2 \cdot H_2O$, followed by sting for 2 hours to prepare an aqueous solution. With slowly dropping ammonia water, pH of the aqueous solution was regulated to pH 8 and coprecipitated. And then, the aqueous solution was reflux-heated for 12 hours. The coprecipitated aqueous solution was filtered and washed with distilled water. A catalyst was separated and dried in a 120° C. drier for 6 hours. The dried catalyst was put in an electric furnace and heated at 800° C. for 6 hours in the presence of air for calcining.

The catalyst prepared above had the composition of $CrZr_5O_x$.

Example 2

An experiment was performed by the same manner as described in example 1, except that calcining was induced at 1200° C.

Example 3

To 60☐ distilled water was added 2.68 g of $Ti[OCH(CH_3)_2]$, followed by stirring with dropping nitric acid until the solution became transparent. To the solution were added 12.35 g of $ZrO(NO_3)_2 \cdot H_2O$ and 0.24 g of $Cr(NO_3)_3 \cdot 9H_2O$, followed by stirring for 2 hours to prepare an aqueous solution. With slowly dropping ammonia water, pH of the aqueous solution was regulated to pH 8 and coprecipitated. And then, the aqueous solution was reflux-heated for 12 hours. The coprecipitated aqueous solution was filtered and washed with distilled water. A catalyst was separated and dried in a 120° C. drier for 6 hours. The dried catalyst was put in an electric furnace and heated at 800° C. for 6 hours in the presence of air for calcining.

The catalyst prepared above had the composition of $CrZr_{83.3}Ti_{16.7}O_x$.

Example 4

An experiment was performed by the same manner as described in example 3, except that calcining was induced at 1200° C.

Example 5

The catalyst prepared in example 3 was used in the steam cracking of hexane for 5 hours under the same conditions as described in the following experimental example and then recovered and regenerated by burning coke at 800° C. for 6 hours in the presence of air.

Example 6

To 60° C. distilled water was added 10.77 g of $ZrO(NO_3)_2 \cdot H_2O$, followed by stirring for one hour. To the solution was added 6.77 g of $Cr(NO_3)_3 \cdot 9H_2O$, followed by stirring for one hour to prepare an aqueous solution. 7.46 g of phosphoric acid was slowly dropped to the aqueous solution, followed by stirring for one hour. With dropping ammonia water slowly to the aqueous solution containing phosphorus, pH of the solution was regulated to 4 and coprecipitated. And then, the aqueous solution was reflux-heated for 12 hours. The coprecipitated aqueous solution was filtered and washed with distilled water. A catalyst was separated and dried in a 120° C. drier for 6 hours. The dried catalyst was put in an electric furnace and heated at 800° C. for 6 hours in the presence of air for calcining.

The catalyst prepared above had the composition of $CrZr_{0.5}P_{5.24}O_x$.

Example 7

An experiment was performed by the same manner as described in example 1, except that calcining was induced at 1200° C.

Example 8

The catalyst prepared in example 1 was used in the steam cracking of hexane for 5 hours under the same conditions as described in the following experimental example and then recovered and regenerated by burning coke at 800° C. for 6 hours in the presence of air.

Example 9

To 60° C. distilled water were added 5.61 g of $ZrO(N_3)_2 \cdot H_2O$, 2.26 g of $Cr(NO_3)_3 \cdot 9H_2O$ and 9.93 g of $Ce(NO_3)_3 \cdot 6H_2O$ in that order, followed by stirring for one hour to prepare an aqueous solution. 7.46 g of phosphoric acid was slowly dropped to the aqueous solution, followed by stirring for one and half hour. With dropping ammonia water slowly to the aqueous solution containing phosphorus, pH of the solution was regulated to 4 and coprecipitated. And then, the aqueous solution was reflux-heated for 12 hours. The coprecipitated aqueous solution was filtered and washed with distilled water. A catalyst was separated and dried in a 120° C. drier for 6 hours. The dried catalyst was put in an electric furnace and heated at 800° C. for 6 hours in the presence of air for calcining.

The catalyst prepared above had the composition of $CrZr_4Ce_4P_{11.13}O_x$.

Example 10

An experiment was performed by the same manner as described in example 4, except that calcining was induced at 1200° C.

Example 11

The catalyst prepared in example 4 was used in the steam cracking of hexane for 5 hours under the same conditions as described in the following experimental example and then recovered and regenerated by burning coke at 800° C. for 6 hours in the presence of air.

Comparative Example 1

500 μm sized α-alumina with 99.5% purity was used as a catalyst.

Comparative Example 2

15.87 g of magnesium nitrate hydrate, 4 g of potassium hydroxide and 7.12 g of ammonium phosphate were dissolved in 150 ml of distilled water to prepare an aqueous solution. The aqueous solution was dried by distillation under vacuum pressure. The catalyst dried by distillation under vacuum pressure was further dried in a 110° C. drier for 10 hours, followed by calcining in an electric furnace at 1100° C. for 6 hours in the presence of air.

The catalyst prepared above had the composition of $KMgPO_4$.

Experimental Example

Catalysts prepared in the above examples and comparative examples were used for hydrocarbon steam cracking as follows.

Hexane was used as hydrocarbon. Quartz tube with ¼" outside diameter was filled with catalyst by 5 cm in height and the reaction temperature was maintained at 750° C. Hexane (2.75 ml/hr) and water (0.92 ml/hr) were injected by using a syringe pump. The hexane and water were vaporized in a vaporizer at 400° C. and at 500° C. respectively. The two gases were well mixed and contacted with the catalyst layer. The discharged product from the reactor proceeded to gas chromatography for quantitative analysis. The yield of the discharged product was calculated by the following mathematical formula 1 and the results are shown in Table 1.

Yield of product(weight %)=weight of product/weight of injected hexane×100     Mathematical Formula 1

TABLE 1

|  |  | Catalyst composition | Calcining temp (° C.) | Yield (weight %) | | | Conversion (weight %) | Ratio of Ethylene to propylene (reaction temp 750° C.) |
|---|---|---|---|---|---|---|---|---|
|  |  |  |  | Ethylene | Propylene | Ethylene + propylene |  |  |
| Example | 1 | $CrZr_5O_x$ | 800 | 73.93 | 19.30 | 42.34 | 73.93 | 1.2 |
|  | 2 | $CrZr_5O_x$ | 1200 | 61.21 | 15.84 | 38.32 | 61.21 | 1.4 |
|  | 3 | $CrZr_{83.3}Ti_{16.7}O_x$ | 800 | 75.12 | 20.18 | 44.57 | 75.12 | 1.2 |
|  | 4 | $CrZr_{83.3}Ti_{16.7}O_x$ | 1200 | 67.69 | 18.07 | 42.17 | 67.69 | 1.3 |
|  | 5 | $CrZr_{83.3}Ti_{16.7}O_x$ | 800 | 72.70 | 19.60 | 43.52 | 72.70 | 1.2 |
|  | 6 | $CrZr_{0.5}P_{5.24}Ox$ | 800 | 85.65 | 22.32 | 48.29 | 85.65 | 1.2 |
|  | 7 | $CrZr_{0.5}P_{5.24}Ox$ | 1200 | 79.23 | 20.88 | 44.25 | 79.23 | 1.1 |
|  | 8 | $CrZr_{0.5}P_{5.24}Ox$ | 800 | 83.54 | 21.80 | 47.46 | 83.54 | 1.2 |
|  | 9 | $CrZr_4Ce_4P_{11.13}Ox$ | 800 | 83.09 | 21.43 | 45.67 | 83.09 | 1.1 |
|  | 10 | $CrZr_4Ce_4P_{11.13}Ox$ | 1200 | 79.37 | 21.11 | 46.29 | 79.37 | 1.2 |
|  | 11 | $CrZr_4Ce_4P_{11.13}Ox$ | 800 | 83.38 | 21.53 | 46.62 | 83.38 | 1.2 |
| Comparative Example | 1 | α-alumina | — | 60.42 | 14.30 | 36.57 | 60.42 | 1.6 |
|  | 2 | $KMgPO_4$ | 1100 | 59.94 | 14.80 | 38.16 | 59.94 | 1.6 |

As shown in Table 1, the catalyst of example 1, which is an oxide catalyst containing Cr and Zr, could increase the conversion of hexane cracking approximately 14 weight % and the yield of olefin approximately 6 weight %, compared with those of inactive α-alumina of comparative example 1, owing to the generated catalytic active site of hydrocarbon steam cracking resulted from the complicated oxide structure of Cr and Zr. The catalyst of the invention, an oxide catalyst containing Cr and Zr, was also confirmed to be more effective in the production of light olefin, particularly propylene, by hydrocarbon cracking than $KMgPO_4$ of comparative example 2 which had been known to have catalytic activity.

In the meantime, the catalyst of example 3, which is an oxide catalyst containing Cr, Zr and Ti, a transition metal, prepared by calcining at 800° C., exhibited a slight increase of catalytic activity and accordingly light olefin selectivity and yield was increased. Precisely, compared with the catalyst of example 1, this catalyst exhibited approximately 1.2 weight % increased conversion rate of hexane degradation and 2.2 weight % increased olefin yield.

In general, the reaction temperature during hydrocarbon steam cracking is 800° C. or more. However, the catalyst can be exposed to a locally higher temperate resulted from hot spot generated during burning to eliminate coke generated on the surface of a catalyst or inside wall of a reactor. So, a catalyst having excellent thermal stability is required to keep its catalytic activity even at higher temperature more than 1000° C. for successful hydrocarbon cracking.

The catalyst containing Cr and Zr of example 2 which was prepared by firing at 1200° C. exhibited reduced catalytic activity for hexane cracking and lower olefin yield approximately 4 weight %, compared with the catalyst of example 1, but still exhibited higher catalytic activity than α-alumina of comparative example 1 which exhibited no catalytic activity.

The catalytic activity of the catalyst containing Cr, Zr and Ti of example 4 which was prepared by calcining at 1200° C. was slightly reduced, compared with the catalyst of example 3, but light olefin yield was still high, which was 5.6 weight % higher than that of α-alumina of comparative example 1. The catalyst of example 5, regenerated after burning the coke generated on the surface of the catalyst at high temperature upon completion of hydrocarbon steam cracking, maintained its catalytic activity. That is, the oxide catalyst containing Cr, Zr and Ti is very stable at low temperature less than 1000° C. and at high temperature up to 1200° C. and maintains excellent catalytic activity.

As shown in Table 1, the catalyst of example 6, which is a phosphoric oxide catalyst containing Cr and Zr, exhibited approximately 26 weight % increased conversion rate of hexane cracking and approximately 12 weight % increased olefin yield, compared with α-alumna of comparative example 1 that had no catalytic activity. Considering that the activity of α-alumina was not much different from that of $KMgPO_4$ of comparative example 2 which had been known to have catalytic activity, the phosphoric oxide catalyst containing Cr and Zr was confirmed to be more effective in the production of light olefin particularly propylene by hydrocarbon cracking. The catalysts of examples 6-8 having the composition of $CrZr_{0.5}P_{5.24}Ox$ exhibited significantly increased hydrocarbon cracking activity, compared with the oxide catalyst containing Cr and Zr of example 1, and thus the light olefin yield by these catalysts were approximately 6 weight % increased.

The catalyst of example 7 containing Cr and Zr, which was prepared by firing at 1200° C. was compared with the catalyst of example 6. As a result, the hexane cracking activity and the yield of light olefin were slightly reduced. But, compared with α-alumina of comparative example 1, the yield of olefin was at least approximately 8 weighty increased. The catalyst of example 8, regenerated after burning the coke generated on the surface of the catalyst after hydrocarbon cracking, maintained its catalytic activity without damaging greatly, suggesting that it might be recycled. The catalyst of example 7 was also compared with that of example 2 containing Cr and Zr, which was prepared by calcining at 1200° C. As a result, the catalyst of example 7 had high melting point and thus had excellent thermal stability, exhibited less catalytic activity loss, and had a high hexane conversion.

The catalyst of example 9 containing Cr, Zr and Ce, which was prepared by calcining a phosphoric oxide catalyst at 800° C., exhibited slightly reduced catalytic activity and therefore reduced the yield of lower olefin. The catalyst of example 10 prepared by calcining at 1200° C. also exhibited slightly reduced catalytic activity but increased light olefin selectivity, indicating the increased yield of light olefin, which was 1.6 weighty higher than that of the catalyst of example 7. The catalyst of example 11 regenerated after hydrocarbon cracking by burning the coke generated on the surface of the catalyst maintained its catalytic activity and thus hexane conversion was not reduced. So, a catalyst that is prepared by adding a metal such as Ce to a phosphoric oxide catalyst has improved thermal stability, so that it shows excellent light olefin selectivity even if it is exposed on high temperature of at least 1000° C.

The ratio of ethylene to propylene is an index not only for cracking process severity but also for light olefin selectivity.

As shown in Table 1, when cracking of the invention was performed at 750° C., the ratio of ethylene to propylene in examples 1-11 was in the range of 11.1-1.4 and the ratio of ethylene to propylene in comparative examples 1-2 was 1:1.6. That is, the ratio of ethylene to propylene in oxide catalysts and phosphoric oxide catalysts of examples 1-11 is lower than that in catalysts of comparative examples 1-2, suggesting that the oxide catalysts and phosphoric oxide catalysts of the invention are effective in increasing propylene selectivity.

INDUSTRIAL APPLICABILITY

As explained hereinbefore, the present invention provides an oxide catalyst and a phosphoric oxide catalyst for hydrocarbon steam cracking with excellent thermal stability at high temperature and improved light olefin selectivity and yield.

The oxide catalyst or the phosphoric oxide catalyst of the invention can maintain its catalytic activity even at higher temperature than 1200° C. and can be constantly reused after burning the coke generated from hydrocarbon steam cracking.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An oxide catalyst for hydrocarbon steam cracking represented by formula 1, $$CrZr_jA_kO_x \qquad \text{[Formula 1]}$$

wherein, $0.5 \leq j \leq 120$, $5 \leq k \leq 30$, A is a transition metal, and x is a number corresponding to the atomic values of Cr, Zr and A and the numbers of j and k.

2. The oxide catalyst for hydrocarbon steam cracking according to claim 1 wherein the A of formula I is one or more compounds selected from the group consisting of Ti, Nb, Mo, V, Co, Ni, W, Fe and rare earth metals.

3. The oxide catalyst for hydrocarbon steam cracking according to claim 1, wherein the A of formula 1 is Ti.

4. The oxide catalyst for hydrocarbon steam cracking according to claim 1, wherein the cracking is performed at 750° C. in the presence of the oxide catalyst for hydrocarbon steam cracking, and the ratio of the product ethylene to propylene is 1.1-1.4.

* * * * *